United States Patent [19]

Ogino

[11] Patent Number: 4,701,807
[45] Date of Patent: Oct. 20, 1987

[54] METHOD AND APPARATUS FOR PROCESSING AN IMAGE

[75] Inventor: Yoshitaka Ogino, Kawasaki, Japan

[73] Assignee: Canon Kabushiki Kaisha, Tokyo, Japan

[21] Appl. No.: 650,267

[22] Filed: Sep. 13, 1984

[30] Foreign Application Priority Data

Sep. 22, 1983 [JP] Japan ................................ 58-174377
Sep. 22, 1983 [JP] Japan ................................ 58-174378

[51] Int. Cl.$^4$ .......................... H04N 1/40; H04N 1/10
[52] U.S. Cl. ................................. 358/284; 358/280; 358/293; 382/50
[58] Field of Search ............... 358/280, 282, 283, 284, 358/293, 298; 382/50, 53

[56] References Cited

U.S. PATENT DOCUMENTS

| 4,194,221 | 3/1980 | Stoffel | 358/283 |
| 4,414,581 | 11/1983 | Kato et al. | 358/280 |
| 4,495,522 | 1/1985 | Matsunawa et al. | 358/280 |
| 4,525,747 | 6/1985 | Sakai et al. | 358/284 |

Primary Examiner—Howard W. Britton
Assistant Examiner—John K. Peng
Attorney, Agent, or Firm—Fitzpatrick, Cella, Harper & Scinto

[57] ABSTRACT

An image processing apparatus comprises a first discriminator for discriminating an image status of each of a plurality of blocks of an input video data, and a second discriminator for discriminating the image status of the block under consideration based on the image status of the adjacent block. A processing method for the block under consideration is selected in accordance with the outputs from the first and second discriminators.

11 Claims, 18 Drawing Figures

METHOD AND APPARATUS FOR PROCESSING AN IMAGE

BACKGROUND OF THE INVENTION

1. Field of the Invention

The present invention relates to method and apparatus for processing an image suitable to an electronic file, a facsimile, a reader and a digital copier.

2. Description of the Prior Art

In a prior art image processing apparatus such as a copier or a facsimile which reads an original image by means of a solid-state imager such as a CCD and reproduces an image by means of a binary printer as represented by a laser beam printer (LBP), a so-called slice binarizing system is used in which pixel densities derived by reading the original image are compared with a constant threshold (which is usually an intermediate level between a white level and a black level) to binarize them when the original image includes a binary image text as represented by white and black images without gray level such as characters or a document, and a dither method is used when the original image includes gray levels or half tones as in, e.g. a photograph.

Usually, the original text is not classified to whether it is character text or photograph text but, in many cases, both texts coexist. Accordingly, an image zone separation processing system in which the type of image of the image zone is determined by a predetermined algorithm while the original text is read so that the binarizing system is selected, has been proposed and put into practice FIGS. 1-4 show image zone-density distribution charts used by the proposed image zone separation processing system, in which an abscissa represents a one-dimensional image zone A and an ordinate represents a density D. A solid line represents a density distribution in the image zone of the original text, a broken line represents a reproduced density distribution, B represents a threshold for slice binarization and C represent a constant value (discrimination criterion) for discriminating an image content in the image zone. In FIGS. 1 and 2, the density distributions (solid lines) of the original texts are white to black and black to white, respectively. An image zone A(0) is determined as a binary image zone because of an abrupt density change, and the slice binarization is effected in this zone. Image zones A(−1) and A(1) adjacent to the binary image zone A(0) are determined to be gray level zones because a difference between a maximum density Dmax and a minimum density Dmin in each image zone is smaller than the predetermined value C, and the images are processed to the gray levels by the dither method. In the image zone A(0), the density variation ΔD (=Dmax−Dmin) is larger than the predetermined value C (ΔD>C) and the reproduced image is black in a zone A"(0) in which the density D is larger than the threshold B, and white in a zone A'(0) in which the density D is smaller than the threshold B. Accordingly, the reproduced image in the image zone A(0) has a low fidelity (noisy) with only the white to black or black to white edge being emphasized.

In FIGS. 3 and 4, the image zone A(−1) is determined as a binary image zone because of the abrupt density change and slice binarization is effected in this zone. On the other hand, the zones A(0) and A(1) are determined as gray level image zones and the images are processed by the dither method. Accordingly, a noisy image with the black to white or white to black edge being emphasized is reproduced in the image zone A(−1) and the reproduced images are not exact reproductions of the original images.

FIG. 5 shows a block diagram of an image processing apparatus having the image discrimination function as described above. Numerals 3-1 and 3-2 respectively denote a maximum density measuring circuit and a minimum density measuring circuit which determine a maximum density Dmax and a minimum density Dmin of each of 4×4-pixel blocks of image or video data VD. Each of them comprises a RAM (not shown) having a capacity of (number of main scan pixels/4 pixels)×(4 or 6 bits) and a comparator (not shown). The video data VD is supplied from a reader (not shown). Numeral 3-3 denotes a subtractor which calculates Dmax−Dmin for each block and numeral 3-4 denotes a comparator which compares the difference Dmax−Dmin with the predetermined value C and produces a one-bit image zone discrimination result R which is "1" for the binary image zone and "0" for the gray level image zone. The zone discrimination is effected at the fourth line scan. Numeral 3-5 denotes a RAM which latches the image zone discrimination result R discriminated at the fourth line scan until the end of the next fourth line scan. Numeral 3-6 denotes a slice binarizing circuit for binarizing the image line by line by a fixed threshold to produce a binary data Ds, and numeral 3-7 denotes a dither processing circuit for dithering the image line by line to produce a binary data Dd. The slice binarizing circuit 3-6 and the dither processing circuit 3-7 operate in synchronism with the above measuring circuits.

Since the image zone is discriminated at the end of the scan of four lines, it is necessary to delay the binary data Ds and Dd by four lines in order to select the binary data based on the discrimination result. Numerals 3-8 and 3-9 denote RAM's for that purpose. Since the discrimination result is required during the succeeding four line periods, the discrimination result is latched in the RAM 3-5 for four line periods.

S1 denotes a switch for selecting one of the binary data Dd or Ds in one block (image zone). It is switched by a gate circuit 3-10 depending on the discrimination result R.

The input video data VD is dithered or binarized, delayed by four lines and the binary data Dd or Ds is selectively outputted depending on the image zone discrimination result R. Thus, the binary image such as characters and the gray level image such as photographs which coexist on one original document is processed by the slice binarization processing or the dither processing. The binary data is supplied to a device such as a laser beam printer.

The image zone separation processing method in which the original image is divided into 4×4-pixel blocks, calculating the difference ΔD between the maximum density Dmax and the minimum denisty Dmin in each block, and discriminating the block as the binary image zone if ΔD is larger than the predetermined value C and as the gray level image zone if ΔD is smaller, requires a relatively small circuit scale and is a practical method. However, when an original image having an abrupt change from a gray level which is relatively close to the white level to a gray level which is relatively close to the black level is to be reproduced, an image zone which includes a boundary of the change is discriminated as a binary image zone and the subsequent zones are treated as gray level image zones. As a result, the densities of the reproduced image distribute in the gray level close to the white level, white, black and the gray level close to the black level, and the abrupt white-to-black changes appear in the boundaries. Accordingly, a very noisy and inexact image is reproduced.

When the original image includes a character written by a thick black line on a white background, edges of the thick line are sharp because of the slice binarization processing but the inside of the thick line is dither-processed. As a result, the character is not exactly reproduced. When the processed image information is transferred, a transfer efficiency is very low.

SUMMARY OF THE INVENTION

It is an object of the present invention to provide method and apparatus for processing an image which assure a high quality of image reproduction.

It is another object of the present invention to provide method and apparatus for processing an image which can reproduce an exact image of an original image.

It is another object of the present invention to provide an improved image processing apparatus having an image discrimination function.

It is another object of the present invention to provide method and apparatus for processing an image which can reproduce an image with a high transfer efficiency.

It is another object of the present invention to provide an image processing apparatus having an excellent image identification function.

It is another object of the present invention to provide an image processing apparatus capable of high speed processing.

The above and other objects of the present invention will be apparent from the following description taken in conjunction with the acompanying drawings.

DETAILED DESCRIPTION OF THE PREFERRED EMBODIMENT

Figure 1:
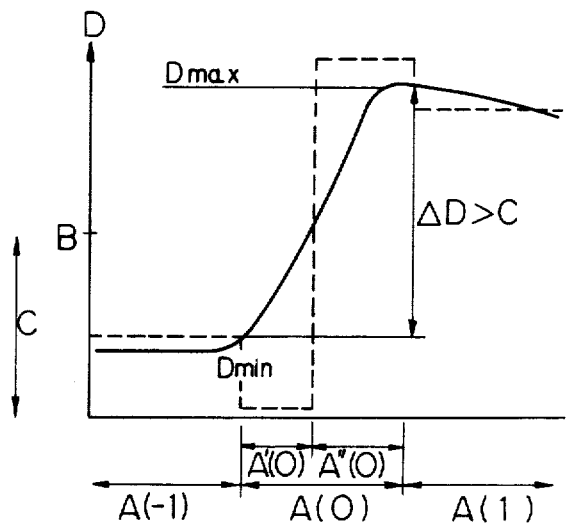
FIGS. 1 to 4 show image zone-density distribution charts by known processing systems.
Figure 2:
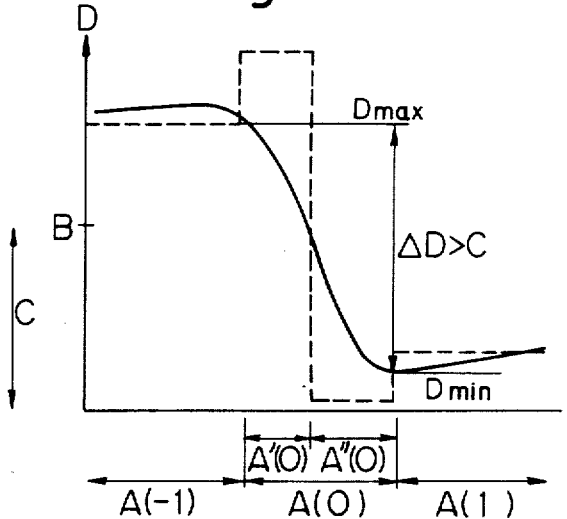
Figure 6:
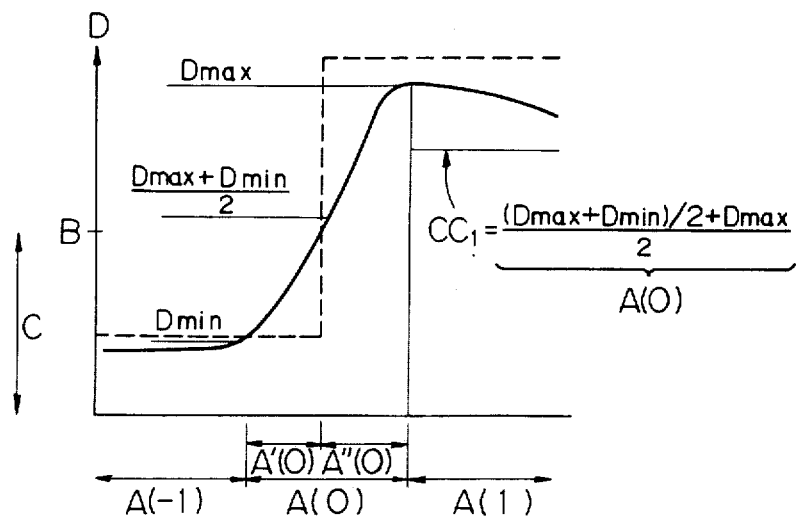
FIGS. 6, 7, 9 and 10 show image zone-density distribution charts by a processing system of the present invention, FIG. 8, composed of FIGS. 8A and 8B, is a circuit diagram of one embodiment, FIG. 11, composed of FIGS. 11A and 11B, is a circuit diagram of another embodiment.
Figure 7:
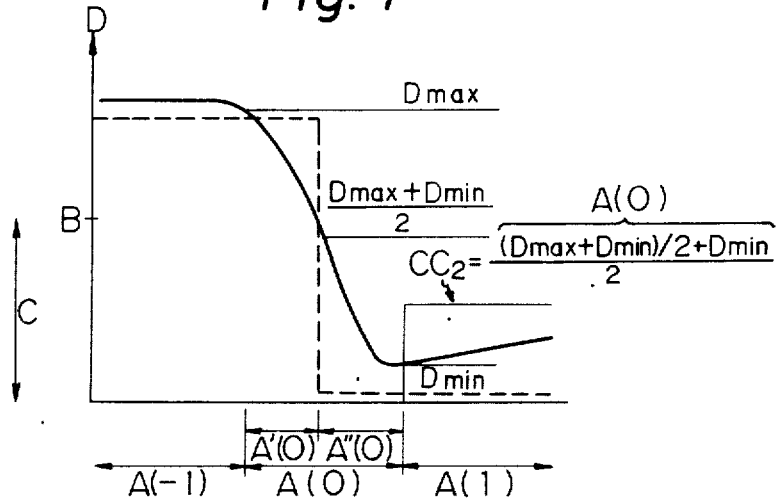

FIGS. 6 and 7 show image zone-density distribution charts for use in a processing method of one embodiment of the present invention, for original images having the same density distributions (solid line) as those of the original images shown in FIGS. 1 and 2. Broken lines show reproduced density distributions in the present embodiment.

In the present embodiment, the image zone A(1) succeeding to the binary image zone A(0) can be processed by the slice binarization processing by determining an image zone separation correction parameter CC (to be described later). As a result, a closer image to the original image can be reproduced.

The first half zone A'(0) of the binary image zone A(0) is processed as shown by broken line reproduction density distributions in FIGS. 6 and 7. The algorithm is such that the left zone A'(0) of the image zone A(0) in FIG. 6, that is, the area reproduced in white because the density is lower than the threshold B in the slice binarization processing, is dither-processed continuously with the image zone A(−1). On the other hand, the left zone A"(0) of the image zone A(0) having a higher density than the threshold (slice level) B is processed by the slice binarization processing and black is reproduced. As a result, the reproduced image in the image zone A(0) does not include an abrupt white-to-black change which is observed in the prior art, and the reproduced images in the zone A(1) and subsequent zones have black-emphasized images.

A circuit for attaining the above algorithm can be constructed by using an OR gate for ORing the binary image signals processed by the dither processing and the slice binarization processing for the image zone A(0). This circuit will be explained later.

In FIG. 7, the left zone A'(0) of the image zone A(0), that is, the zone which is reproduced as block in the slice binarization processing because the density, is higher than the threshold B is dither-processed continuously with the image zone A(−1). On the other hand, the right zone A"(0) of the image zone A(0), that is, the zone having a lower density than the threshold B, is processed by the slice binarization processing and white is reproduced. The image zone A(1) is also reproduced as white by the slice binarization processing. As a result, the abrupt black-to-white change disappears in the image zone A(0) and the images having smoothly changing density are reproduced in the image zones A(−1), A(0) and A(1).

A circuit for processing in the manner shown in FIG. 7 may be similar to the circuit for FIG. 6. It may be attained by using an OR gate which OR's the binary image outputs processed by the dither processing and the slice binarization processing for the white level for each pixel. Thus, the white edges in the image zone A(1) and the subsequent zones are emphasized. This circuit will be explained later.

The application of the processing S(a) of FIG. 6 and the processing S(b) of FIG. 7 to the binary image zone A(0) is now explained.

TABLE 1

| Condition | Processing |
| --- | --- |
| (Dmax + Dmin)/2 ≧ B | S (a) |
| (Dmax + Dmin)/2 < B | S (b) |

Table 1 shows an exmaple in which the application can be classified in the simplest manner. An intermediate density of the binary image zone is set to (Dmax+Dmin)/2, and when it is larger than the predetermined value B, that is, when the image is dark as a whole, the processing S(a) is applied to prevent the reproduction of the white area on the edge. When (Dmax+Dmin)/2<B, the processing S(b) is applied.

The polarity of the density gradation is not significant, as shown in FIGS. 6 and 7. The predetermined value B need not be equal to the fixed threshold B for the slice binarization. The intermediate density may be an average of sixteen pixels in the block or a predetermined proportion of the difference (Dmax−Dmin).

The circuit of the present embodiment is now explained with reference to FIG. 8. Numerals 6-1 and 6-2 denote a maximum density measuring circuit and a minimum density measuring circuit for determining a maximum density Dmax and a minimum density Dmin for each 4×4-pixel image zone. They have similar functions to those of the circuits 3-1 and 3-2 shown in FIG. 3. Numeral 6-3 denotes a subtractor for calculating a density difference ΔD (=Dmax−Dmin) for each image zone (block). Numeral 6-6 denotes a comparator which compares the difference Dmax−Dmin derived from the subtractor 6-3 with the predetermined value C and produces a "1" output indicating the discrimination of the binary image zone when Dmax−Dmin≧C, and produces a "0" output indicating the discrimination of the gray level image zone when Dmax−Dmin<C. A one-bit image zone discrimination result R from the comparator is stored in a RAM 6-12. The subtractor 6-3, comparator 6-6 and RAM 6-12 have similar functions to those of the circuits 3-3, 3-4 and 3-5 shown in FIG. 3.

Numeral 6-4 denotes an adder which calculates an average (Dmax+Dmin)/2. The average is compared with the predetermined value B by an image tone signal comparator 6-7, which produces a "1" output when the image in the image zone is dark as a whole and a "0" output when it is light as a whole. A one-bit image tone signal IT from the image tone signal comparator 6-7, is stored in a RAM 6-13. The output of the adder 6-4, that is, (Dmax+Dmin)/2 is summed with Dmax in an adder 6-5 which calculates $$\frac{(Dmax + Dmin)/2 + Dmax}{2}.$$

The output from the adder 6-4, that, is, (Dmax+Dmin)/2 is also summed with Dmin in an adder 6-33 which calculates $$\frac{(Dmax + Dmin)/2 + Dmin}{2}.$$

Those calculation results are image zone separation correction parameters CC in the first image zone following to the binary image zone.

Referring to FIGS. 6 and 7, the image zone separation correction parameters CC generated in the image zone A(0) are used to determine the processing method for the image zone A(1). Latches 6-34 and 6-35 are provided to allow the use of the image zone separation correction parameters CC generated in the previous image zone, in the image zone under consideration. The first image zone separation correction parameter $$CC_1 \left( = \frac{(Dmax + Dmin)/2 + Dmax}{2} \right)$$

is compared with Dmin in the image zone under consideration by the comparator 6-8 and is also compared with the threshold B by the comparator 6-11. Accordingly, when Dmin>$CC_1$>B, the AND gate 6-14 produces the "1" output, which is stored in the RAM 6-23 through the OR gate 6-20. The second image zone separation parameter $$CC_2 \left( = \frac{(Dmax + Dmin)/2 + Dmin}{2} \right)$$

is compared with Dmax in the image zone under consideration by the comparator 6-10 and is also compared with the threshold B by the comparator 6-9. Accordingly, when Dmax<$CC_2$<B, the AND gate 6-15 produces the "1" output, which is stored in the RAM 6-23 through the OR gate 6-20. The one-bit signal stored in the RAM 6-23 for each image zone is referred to as a correction signal CS.

For example, when the image density changes as shown in FIG. 6, the above condition Dmin>$CC_1$>B is met in the image zone A(1) under consideration and the AND gate 6-14 produces the "1" output, which is stored in the RAM 6-23.

When the image density changes as shown in FIG. 7, the above condition Dmax<$CC_2$<B is met in the image zone A(1) under consideration and the AND gate 6-15 produces the "1" output, which is stored in the RAM 6-23. Numeral 6-36 denotes a slice binarizing circuit for binarizing the video data VD inputted for each pixel by the fixed threshold B to produce the binary data Ds, numeral 6-37 denotes a dither processing circuit for dithering the video data VD by a predetermined dither matrix to produce the binary data Dd, and numerals 6-38 and 6-39 denote RAM's for storing (or delaying) the binary data Ds and Dd from the slice binarizing circuit and the dither processing circuit, by four lines. They are used to synchronize the image zone discrimination result R with the binary data.

Figure 3:
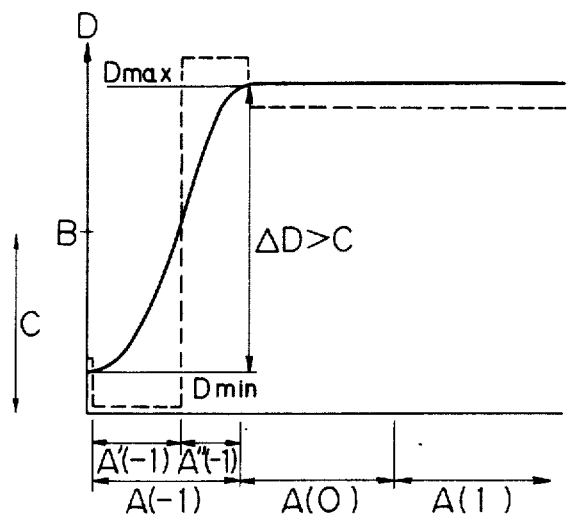

The slice binarizing circuit 6-36, the dither processing circuit 6-37 and the RAM's 6-38 and 6-39 have similar functions to those of the circuits 3-6, 3-7, 3-8 and 3-9 shown in FIG. 3.

Connected to the RAM's 6-38 and 6-39, through shift registers, are an OR gate 6-25 for ORing the binary data Ds and Dd to carry out the processing S(a) and an AND gate 6-24 for ANDing the binary data Ds and Dd to carry out the processing S(b). SWS denotes a switch connected to the shift register 6-16 to select the slice binarization data Ds, SW(a) denotes a switch connected to the OR gate 6-25 to select the binary data produced by the processing S(a), SW(b) denotes a switch connected to the AND gate 6-24 to select the binary data produced by the processing S(b), and SWD denotes a switch connected to the shift register 6-17 to select the binary data Dd. The switch SWS is actuated when the output of the gate circuit 6-32 or 6-41 is "1", and the switches SW(a), SW(b) and SWD are actuated when the outputs of the gate circuits 6-29, 6-30 and 6-42 are "1", respectively. The binary data are supplied to a printer and an encoding circuit through those switches.

Numerals 6-18 and 6-22 denote latches for delaying the image zone discrimination result R outputted from the RAM 6-12. The AND gate 6-21 extracts a case where all of the three image zones A(1), A(0) and A(−1) are binary image zones, and actuates the switch SWS through the AND gate 6-28 and the OR gate 6-32 to apply the slice binarization processing to the image zone A(0) under consideration.

The latches 6-19 and 6-31 and the shift registers 6-16 and 6-17 serve to compensate for the delay due to the latch 6-18.

The gate circuits 6-26, 6-27, 6-28, 6-29, 6-30, 6-32, 6-40, 6-41 and 6-42 select the switches SWS, SW(a), SW(b) and SWD, one for each block in accordance with image conditions represented by the image zone discrimination result R, the image tone signal IT and the correction signal CS.

Figure 8A:
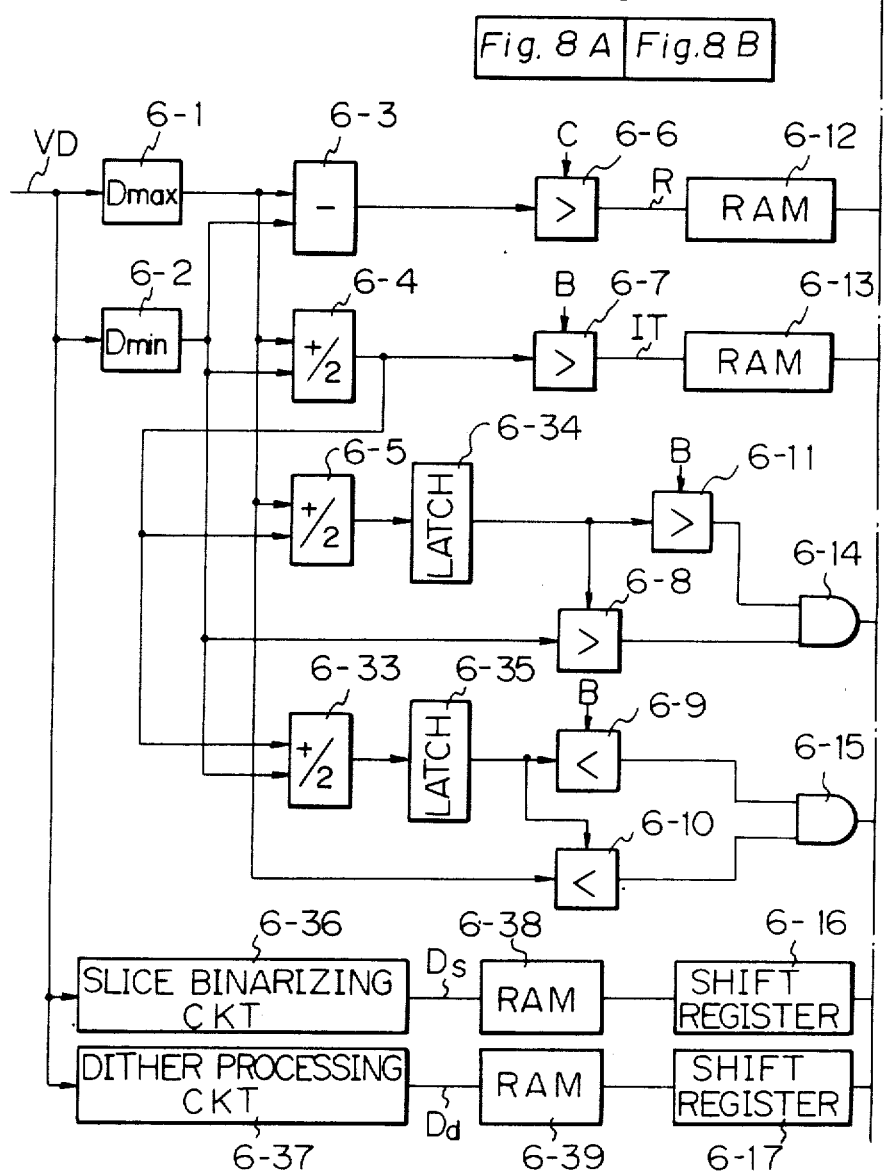
Figure 8B:
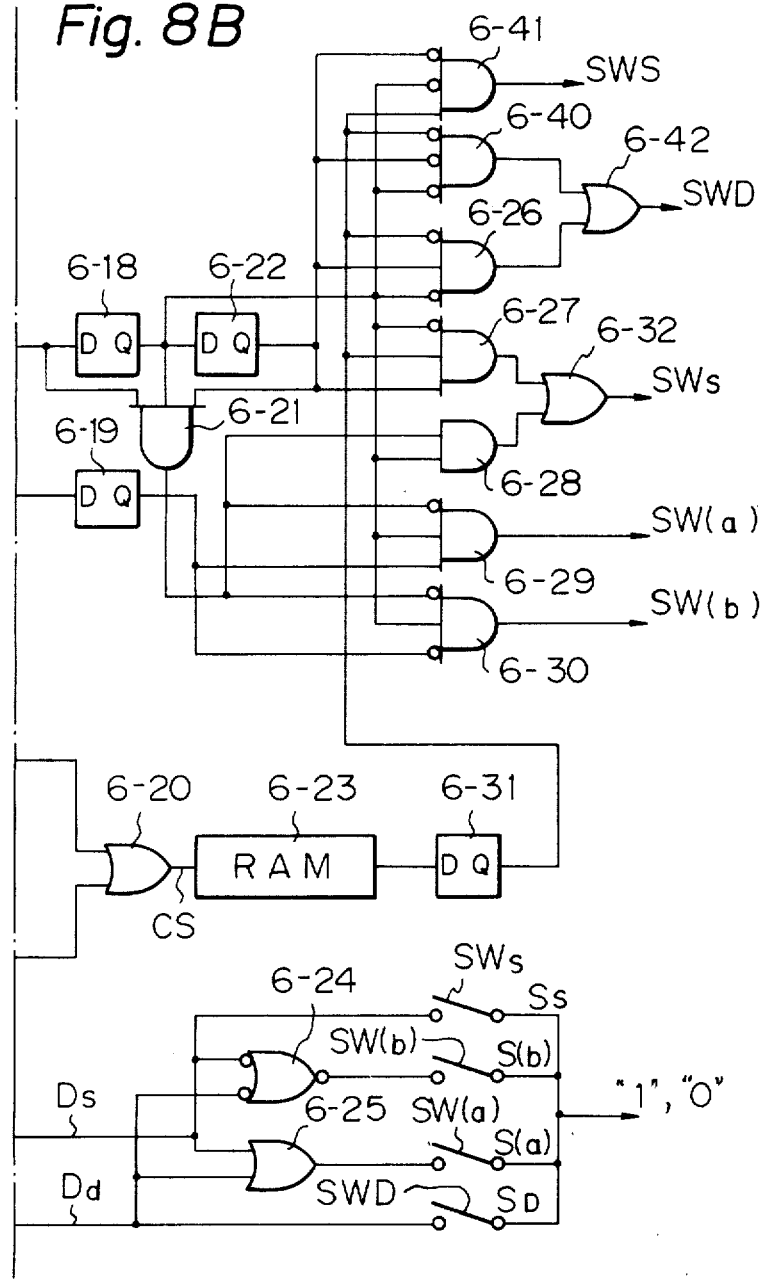

The operation of the circuit of FIG. 8 is now explained with reference to Tables 2 and 3.

Table 2 shows setting conditions for the one-bit signal stored in the RAM's 6-12 and 6-23 for each block, and Table 3 shows status of the RAM when the video data is applied and the processing mode selected for each block. The addresses in the RAM address in Table 3 correspond to the block numbers. In the column "processing" in Table 3, Ss represents the slice binarization processing, $S_D$ represents the dither processing, S(a) represents the OR operation of the binary data Ds and Dd, and S(b) represents the AND operation of the binary data Ds and Dd.

TABLE 2

| RAM No. | RAM Bit Setting Condition |
|---|---|
| 6-12 | "1" if $\Delta D > C$, "0" if $\Delta D \leq C$ |
| 6-13 | "1" if $(Dmax + Dmin)/2 \geq B$ |
|  | "0" if $(Dmax + Dmin)/2 < B$ |
| 6-23 | "1" if $Dmin > CC_1 > B$ or $Dmax < CC_2 < B$ |
|  | "0" if $Dmin < CC_1 > B$ or $Dmax > CC_2 < B$, |
|  | $Dmin > CC_1 < B$ or $Dmax < CC_2 > B$ |

The RAM address and the processing under the condition of Table 2 are given in Table 3.

TABLE 3

| RAM No. | RAM Address | | | | | | | | | | | | |
|---|---|---|---|---|---|---|---|---|---|---|---|---|---|
|  | 0 | 1 | 2 | 3 | 4 | 5 | 6 | 7 | 8 | 9 | 10 | 11 | 12 |
| 6-12 | 1 | 0 | 0 | 0 | 1 | 0 | 0 | 0 | 0 | 0 | 0 | 0 | 0 |
| 6-13 | 1 | X | X | X | 0 | X | X | X | X | X | X | X | X |
| 6-23 | X | 1 | 1 | 1 | X | 1 | 1 | 1 | 0 | 0 | 0 | 0 | 0 |
| Processing | S(a) | $S_S$ | $S_S$ | $S_S$ | S(b) | $S_S$ | $S_S$ | $S_S$ | $S_D$ | $S_D$ | $S_D$ | $S_D$ | $S_D$ |

Note:
X indicates an insignificant bit.

In the circuit of FIG. 8, when the image zone immediately preceding to the image zone under consideration is the binary image zone (processing S(a) or S(b)) and the condition $Dmin > CC_1 > B$ or $Dmax < CC_2 < B$ (where Dmax and Dmin are the maximum density and the minimum density in the image zone under consideration) is met, the image zone under consideration is processed by the slice binarization processing even if the image zone under consideration is discriminated as the gray level image zone. In this case, the switch SWS is actuated by the gate circuits 6-27 and 6-32.

When the image zone under consideration is discriminated as binary image zone and one or both of the image zones adjacent that to under consideration are discriminated as the gray level image zones, the processing S(a) or S(b) is selected depending on the image tone signal IT. The processing S(a) is selected if the image zone under consideration is discriminated as a dark binary image zone by the image tone signal IT, and the processing S(b) is selected if the image zone under consideration is discriminated as a light binary image zone by the image tone signal IT. As a result, no abrupt white-to-black or black-to-white change occurs in the image zone under consideration and the image having smoothly changing density is reproduced.

When the image zone under consideration and the image zone immediately preceding it are discriminated as gray level image zones, the dither processing or the slice binarization processing is applied to the image zone under consideration. The switch SWD is actuated by the gate circuits 6-40 and 6-42, or the switch SWS is actuated by the gate circuit 6-41.

When the image zone under consideration is discriminated as a gray level image zone and the image zone immediately preceding thereto is a binary image zone and the condition $Dmin < CC_1 > B$ or $Dmax > CC_2 < B$ and $Dmin > CC_1 < B$ or $Dmax < CC_2 > B$ is met, the either processing is applied to the image zone under consideration. The switch SWD is actuated by the gate circuits 6-26 and 6-42. When the image zone under consideration and both adjacent image zones are discriminated as the binary image zones, the slice binarization processing is applied to the image zone under consideration.

In accordance with the present embodiment, when the preceding image zone is a binary image zone and the image zone under consideration is discriminated as a gray level image zone, the processing for the image zone under consideration is selected depending on the image status of those two contiguous image zones so that the exact original image can be reproduced. In the present embodiment, the processing method is determined by comparing the density of the image zone under consideration with the density of the preceding image zone.

The operation of the circuit of FIG. 8 is carried out substantially in real time.

Another embodiment of the present invention is explained with reference to FIGS. 9–11 and Tables 2 and 3.

Figure 4:
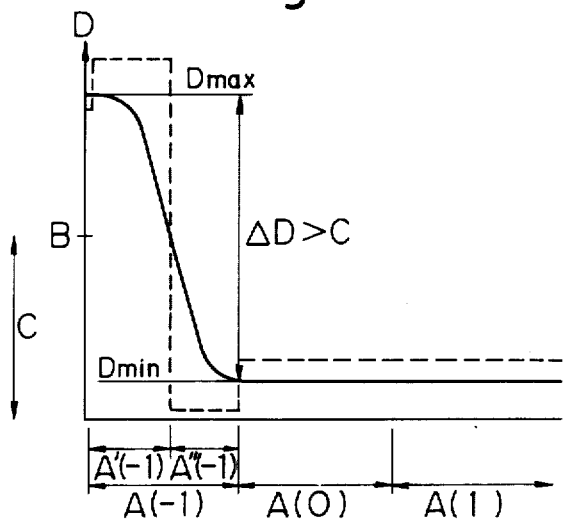
Figure 5:
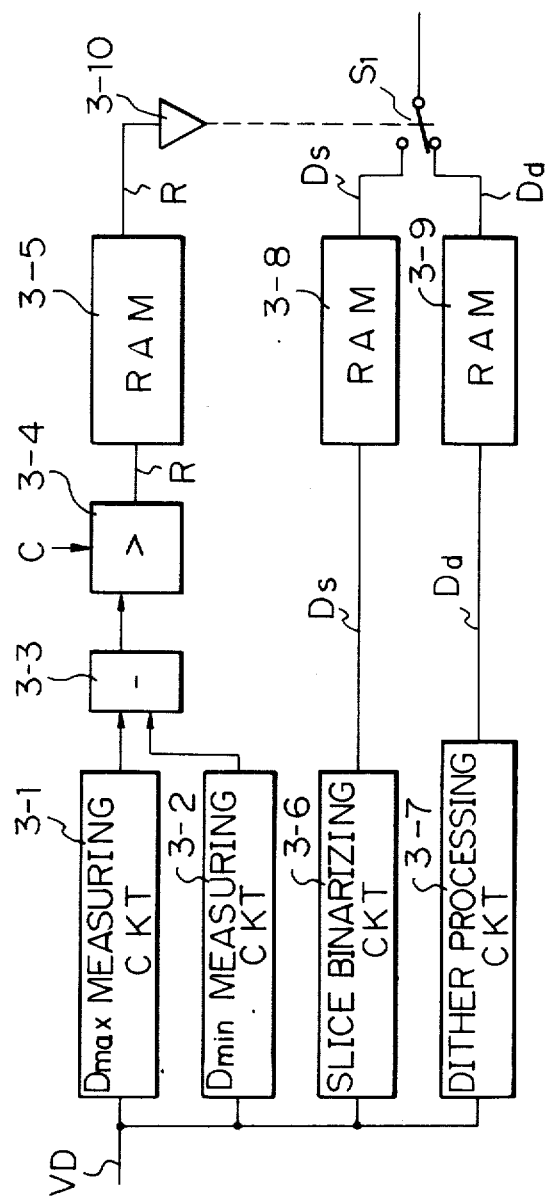
FIG. 5 is a block diagram of a known image processing apparatus.
Figure 9:
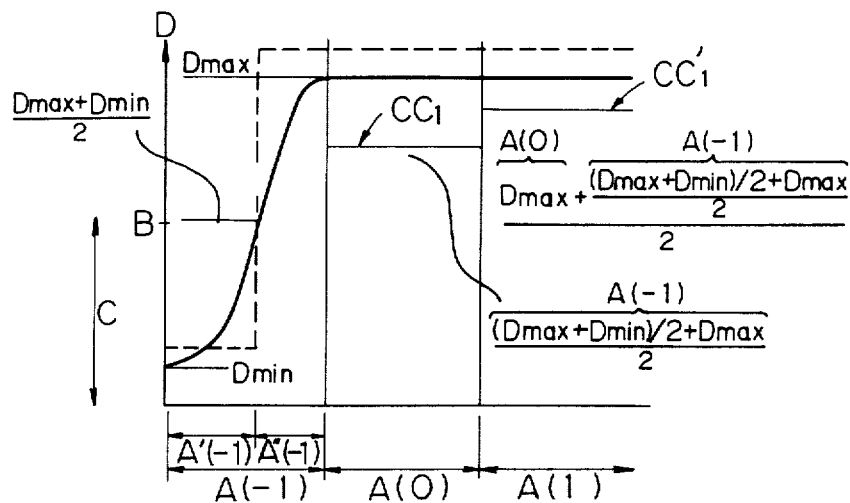
Figure 10:
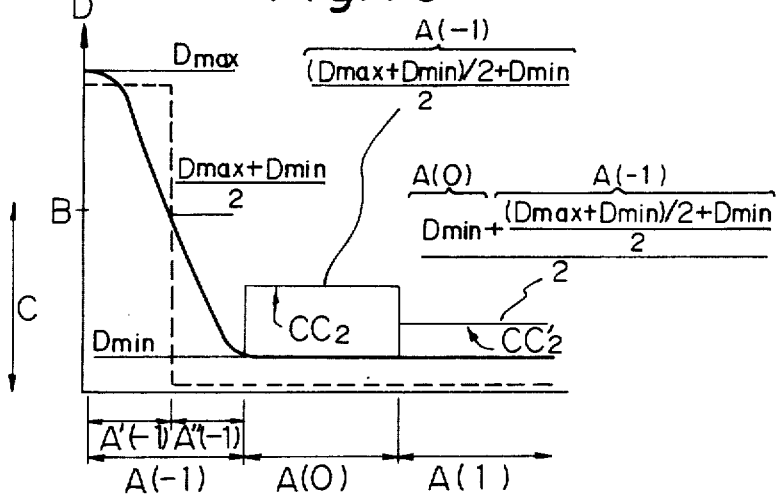

FIGS. 9 and 10 show image zone-density distribution charts for use in the processing method of the other embodiment of the present invention. They represent the density distributions for original images having the same density distributions (solid lines) as those shown in FIGS. 3 and 4. The like elements are designated by the like symbols.

In the present embodiment, like in the first embodiment, the image zone A(0) following the binary image zone A(−1) may be processed by the slice binarization processing by determining the image zone separation correction parameter $CC_1$. The image zone A(1) may also be processed by the slice binarization processing by determining an image zone separation correction parameter $CC_1'$, which is determined based on the density levels of the image zones A(−1) and A(0).

The first binary image zone A(−1) is processed in accordance with either one of the broken line reproduction density distributions shown in FIGS. 9 and 10. The processing for the binary image zone A(−1) was explained in detail with respect to the binary image zone A(0) in FIGS. 6 and 7 and hence it is not explained here.

Accordingly, in the image zone A(−1) of FIG. 9, the processing S(a) is applied and no abrupt white-to-black change occurs. In the image zones A(0) and A(1), the exact original image is reproduced with black being continuously emphasized.

Similarly, in the image zone A(−1) of FIG. 10, the processing S(b) is applied and no abrupt black-to-white change occurs. In the image zones A(0) and A(1), the exact original image is reproduced with white being continuously emphasized.

The circuit of the present embodiment is explained with reference to FIG. 11 in which the like elements to those shown in FIG. 8 are designated by the like numerals and the explanation thereof is omitted.

The image zone discrimination result R outputted from the comparator 6-6 is delayed by a latch 6-50 and then supplied to select terminals of multiplexers 6-45 and 6-46 which select inputs X and Y. The multiplexers 6-45 and 6-46 select the input Y when the preceding image zone (output of the latch 6-50) is the binary image zone, and a latch 6-47 supplies an average density (Dmax+Dmin)/2 in the preceding image zone to the adders 6-5 and 6-33. Since the maximum density Dmax in the image zone under consideration is also supplied to the adder 6-5 by the latch 6-48, the adder 6-5 calculates $$\frac{(Dmax + Dmin)/2 + Dmax}{2}.$$

Similarly, the minimum density Dmin in the image zone under consideration is supplied to the adder 6-33 by the latch 6-49 and the adder 6-33 calculates $$\frac{(Dmax + Dmin)/2 + Dmin}{2}.$$

The outputs from the adders 6-5 and 6-33 are used as the image zone separation correction parameters CC (formula for A (0) in FIGS. 9 and 10) in the first image zone following to the binary image zone. Referring to FIGS. 9 and 10, when the processing method for the image zone A(0) following to the binary image zone is determined in the circuit of FIG. 11, the image zone separation correction parameter CC generated in the binary image zone A(−1) is used. The latches 6-47, 6-48 and 6-49 are provided to latch the image zone separation correction parameter CC based on the average density (Dmax+Dmin)/2 and the maximum and minimum densities Dmax and Dmin of the preceding image zone for use for the image zone under consideration. As described above, the first image zone separation correction parameter $$CC_1 \left( = \frac{(Dmax + Dmin)/2 + Dmax}{2} \right)$$

is compared with Dmin of the image zone under consideration by the comparator 6-8, and is also compared with the threshold B by the comparator 6-11. Accordingly, only when $Dmin > CC_1 > B$, the AND gate 6-14 produces the "1" output, which is stored in the RAM 6-23. Similarly, the second image zone separation correction parameter $$CC_2 \left( = \frac{(Dmax + Dmin)/2 + Dmin}{2} \right)$$

is compared with Dmax of the image zone under consideration by the comparator 6-10, and is also compared with the threshold B by the comparator 6-9. Accordingly, only when $Dmax < CC_2 < B$, the AND gate 6-15 produces the "1" output, which is stored in the RAM 6-23. The image zone separation correction parameters $CC_1$ and $CC_2$ are also supplied to the latches 6-43 and 6-44, respectively. The multiplexers 6-45 and 6-46 select the input X when the preceding image zone is the gray level image zone so that the outputs of the latches 6-43 and 6-44 which latch the image zone separation correction parameters $CC_1$ and $CC_2$ are supplied to the adders 6-5 and 6-33, respectively. Accordingly, the adders 6-5 and 6-33 calculate new image zone separation correction parameters $$CC_1' \left( = \frac{Dmax + (Dmax + Dmin)/2 + Dmax}{2} \right) \text{ and}$$

$$CC_2' \left( = \frac{Dmin + (Dmax + Dmin)/2 + Dmin}{2} \right).$$

In FIGS. 9 and 10, the preceding image zone A(0) to the image zone A(1) under consideration is discriminated as the gray level image zone and the multiplexers select the input X so that the image zone separation correction parameters $CC_1$ and $CC_2$ used for the preceding image zone A(0) and Dmax and Dmin in the preceding image zone A(0) are supplied to the adders 6-5 and 6-33. As a result, the adders 6-5 and 6-33 produce the new image zone separation correction parameters $CC_1'$ and $CC_2'$, which are supplied to the comparators 6-8, 6-10 and 6-11, 6-9, respectively. Accordingly, only when $Dmin > CC_1' > B$, the AND gate 6-14 produces the "1" output, which is stored in the RAM 6-23, and only when $Dmax < CC_2' < B$, the AND gate 6-15 produces the "1" output, which is stored in the RAM 6-23.

Figure 11A:
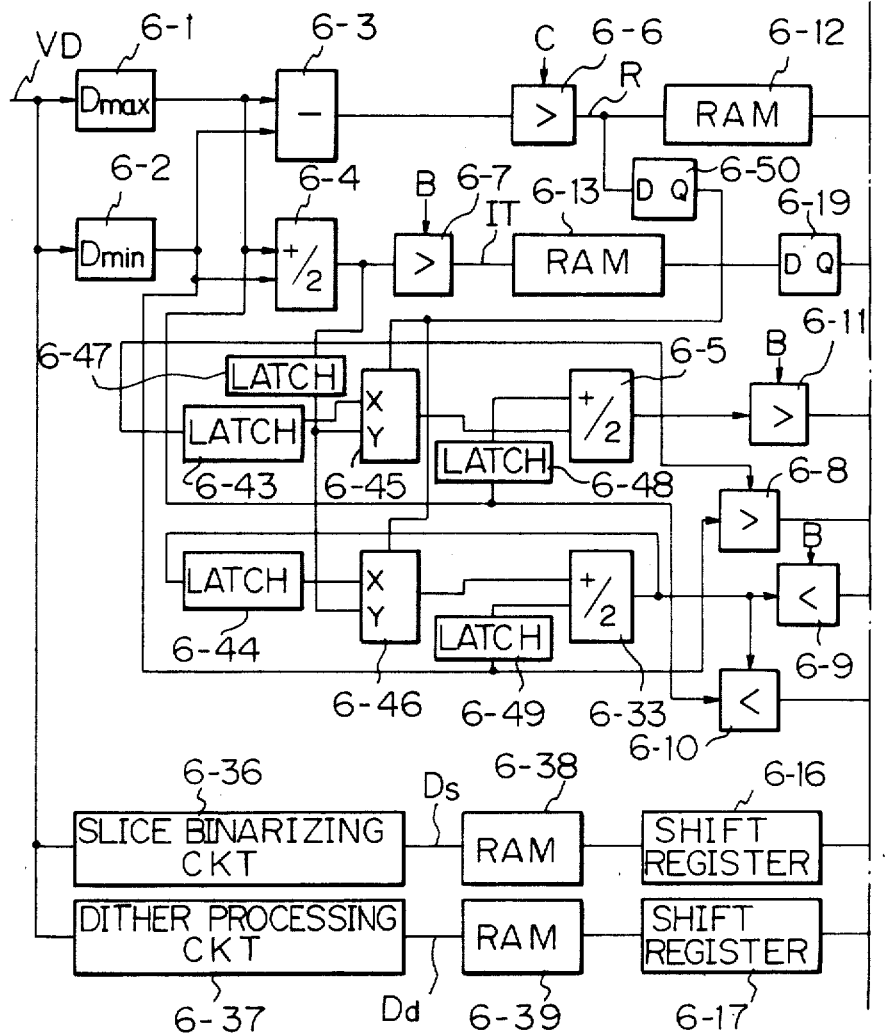
Figure 11B:
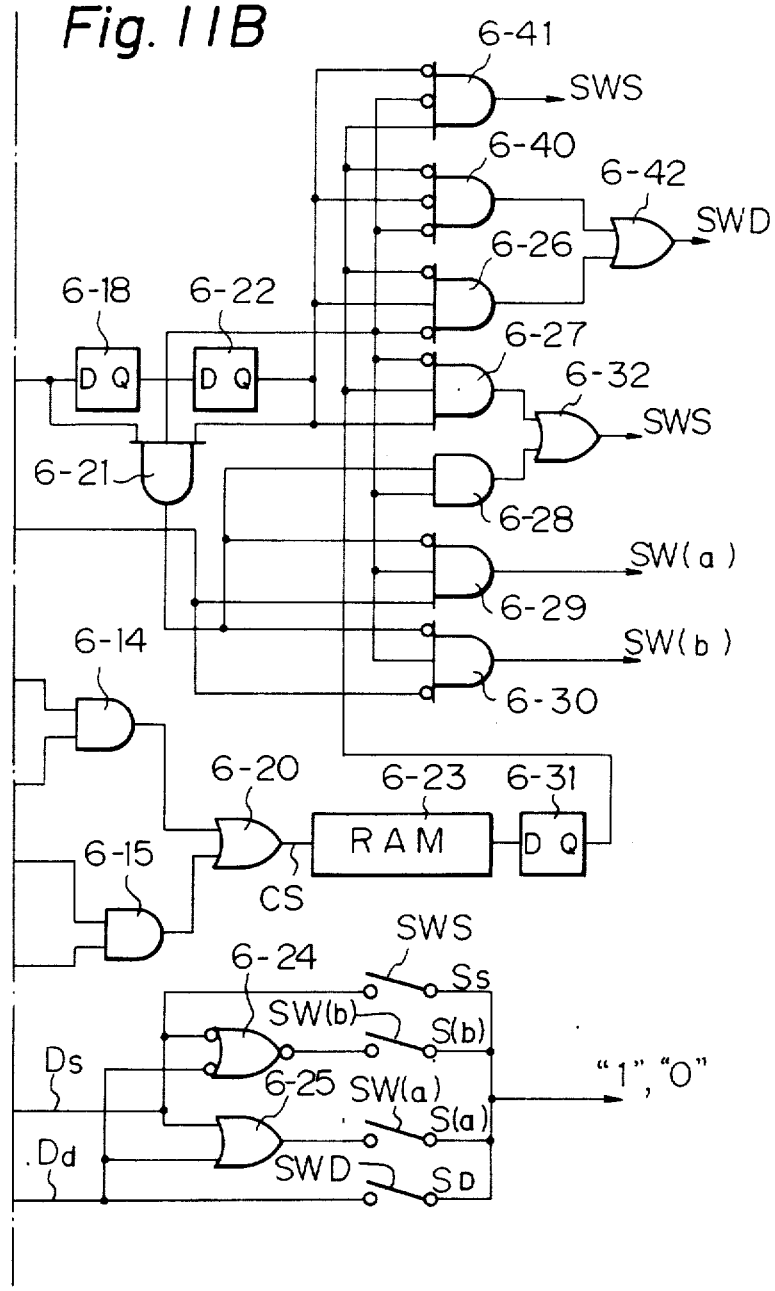

The operation of the circuit of FIG. 11 is explained with reference to FIGS. 9 and 10. The similar operations to those of FIG. 8 are not explained here. The Tables 2 and 3 are also used in the present embodiment. The $CC_1$ and $CC_2$ in Table 2 may be replaced by $CC_1'$ and $CC_2'$. In the circuit of FIG. 11, if the preceding image zone A(−1) to the image zone A(0) under consideration is the binary image zone and the condition $Dmin > CC_1 > B$ or $Dmax < CC_2 < B$ (where Dmin and Dmax are minimum and maximum densities in the image zone under consideration) is met, the image zone A(0) under consideration is processed by the slice binarization processing even if the image zone A(0) under consideration is discriminated as the gray level image zone. In this case, the switch SWS is actuated by the gate circuits 6-27 and 6-32. When the image zone under consideration shifts from A(0) to A(1), the preceding image zone A(0) to the image zone A(1) under consideration is the gray level image zone and hence the outputs of the latches 6-43 and 6-44 are selected. Namely, when the preceding image zone A(0) to the image zone A(1) under consideration is the gray level image zone and the condition $Dmin > CC_1' > B$ or $Dmax < CC_2' < B$ is met, the image zone A(1) under consideration is processed by the slice binarization processing even if the image zone A(1) under consideration is discriminated as the gray level image zone. Thus, in the present embodiment, when the gray level image zones continuously appear, the image zone separation correction parameters are sequentially shifted based on the parameters used in the previous image zone so that the image status can be exactly determined and more appropriate processing can be selected. Consequently, the exact original image can be reproduced. The operation of the circuit of FIG. 11 is carried out on substantially real time.

The calculation of the image zone separation correction parameters CC is not limited to that described above but Dmax and Dmin applied to the inputs of the adders 6-5 and 6-33 may be black level and white level, respectively.

Many transfer methods for improving a transfer efficiency of the reproduced video data have been proposed. In any transfer method, the image signal to be transmitted is determined by the continuity of "1's" or "0's". Accordingly, the image which would have been processed by the dither processing and transmitted by noncontinuous image signal in the prior art method can be transmitted by continuous image signal with more exact reproduction of the original image in the present invention. Accordingly, the transfer efficiency is improved.

In the circuits of FIGS. 8 and 11, the image content discrimination circuit is formed by the maximum density measuring circuit 6-1, the minimum density measuring circuit 6-2, the subtractor 6-6 and the RAM 12. The image content discrimination circuit is explained below in further detail.

Figure 12:
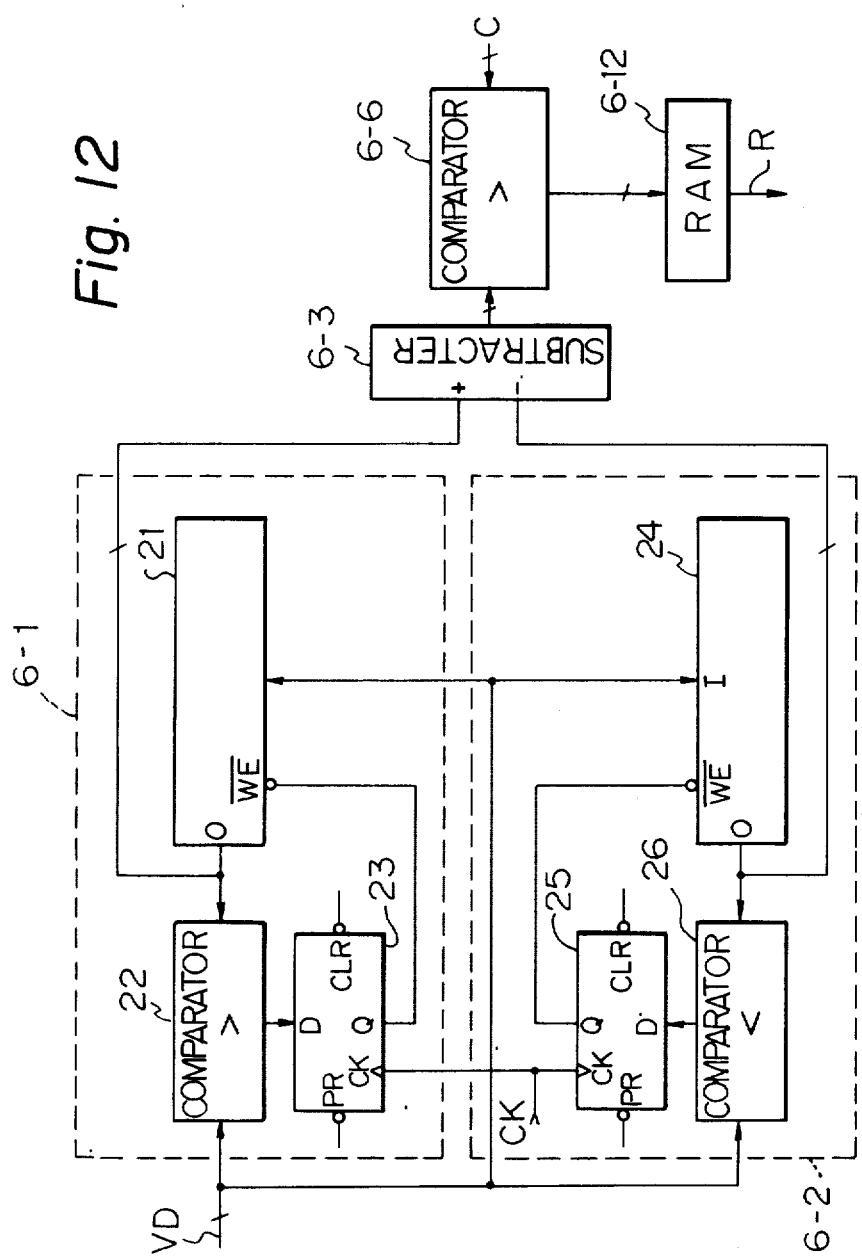
FIG. 12 shows an embodiment of an image content discrimination circuit.

FIG. 12 shows a configuration of the image content discrimination circuit. Numerals 21 and 24 denote 6 bits×1K words RAM's, numerals 22 and 26 denote comparators and numerals 23 and 25 denote flip-flops (F/F). Numeral 6-3 denotes the subtractor, numeral 6-6 denotes the comparator and numeral 6-12 denotes the RAM for storing one bit×1K word discrimination result.

The RAM 21, the comparator 22 and the F/F 23 divide the image density data sequentially read six bits in parallel, that is, the signal VD supplied from an A/D converter (not shown), into 4×4-pixel blocks and detects the maximum density Dmax of the pixels in each block.

The detection of the maximum density Dmax is explained with reference to FIGS. 13 and 14.

Figure 13:
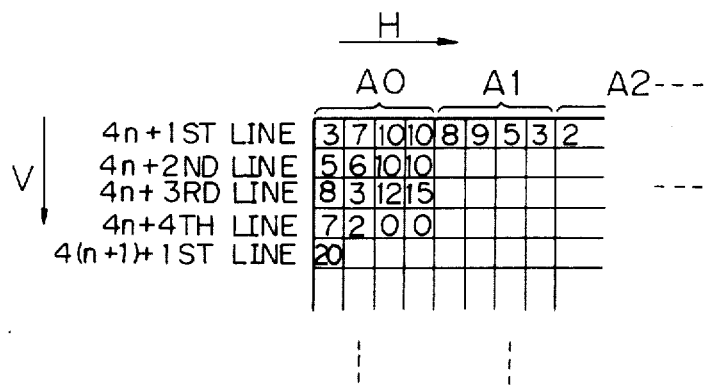
FIG. 13 shows a relation between a digitized pixel density and an original image.

FIG. 13 shows the image densities read by the solid-state imager (not shown) such as a CCD, converted by the A/D converter and arranged to correspond to the original image.

Figure 14:
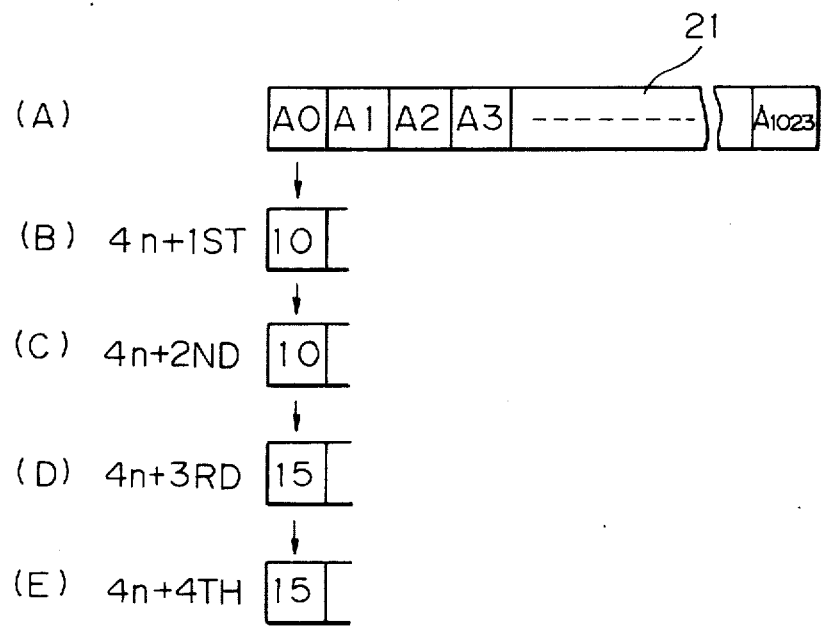
FIG. 14 shows a storage area of a RAM in the image content discrimination circuit and a sequence for storing density data in the storage area.

FIG. 14 shows a storage area of the RAM 21. As shown in FIG. 14(A), the RAM 21 may have a space to store the 4-pixel data for the image read by 16 pels in the main scan direction for an original sheet having a length of 256 mm in the main scan direction, that is, the data for the image zones A0–A1023.

In FIG. 13, arrows H and V indicate the main scan direction and the sub-scan direction of the original sheet, and A0, A1, . . . denote the 4×4-pixel (16-pixel) blocks (image zones).

Let us assume that the video data VD of 3→7→10→10→8→9→. . . are sequentially supplied to the comparator 22 and the RAM 21 in synchronism with the scan clock for reading the pixels when the CCD main-scans the (4n+1)th line. The comparator 22 sequentially compares the sequentially supplied video data with the data stored in the RAM 21, and if the video data is larger, the output of the comparator 22 is held by the F/F 23 and the RAM 21 is set in the write mode.

When the first data in the (4n+1)th line is supplied to the comparator 22, the data is unconditionally written into the RAM 21 as the initial value for the image zone to which the data belongs. Thus, in FIG. 13, the pixel data "3" is the initial value for the image zone A0 and the data "8" is the initial value for the image zone A1.

When the next data "7" in the (4n+1)th line in the image zone A0 is supplied to the comparator 22, it is compared with the initial value "3" stored in the RAM 21. Because 7>3, the content of the RAM 21 is changed from "3" to "7".

Similarly, when the next pixel data "10" is supplied, the content of the RAM 21 is again changed. At the end of the transfer of the four pixel data contained in the image zone A0 in the (4n+1)th line, the maximum density "10" of the four pixels is stored at the address of the storage area of the RAM 21 corresponding to the image zone A0, as shown in FIG. 14 (B).

Similarly, at the end of the scan of the image zone A1 on the (4n+1)th line, the maximum density "9" is stored. The above process is repeated 1024 times one for each of the image zones on the (4n+1)th line. At the end thereof, 1024 data are stored as the maximum densities for the image zones on the (4n+1)th line.

During the scan for the (4n+2)th line, the video data are sequentially compared with the maximum densities of the corresponding image zones on the (4n+1)th line. Accordingly, at the end of the processing for the (4n+2)th line, the data "10" is stored as the maximum density at the area of the RAM 21 corresponding to the image zone A0, as shown in FIG. 14 (C).

Similarly, at the ends of the processing to the (4n+3)th line and the (4n+4)th line, the data "15" is stored as shown in FIGS. 14(D) and 14(E).

The detected data "15" which is the maximum density Dmax in the image zone A0 is read from the RAM 21 before the initial value "20" is written into the RAM 21 in the processing for the $\{(4n+1)+1\}$th line, and the data "15" is supplied to the subtractor 6-3.

The RAM 24, the comparator 26 and the F/F 25 detect the minimum density Dmin of the pixels in the image zone in the same manner as that for the detection of the maximum density.

The subtractor 6-3 calculates the difference Dmax−Dmin of the image zone or the density gradient in the image zone based on the maximum density Dmax and the minimum density Dmin in the image zone. The comparator 6-6 compares the gradient Dmax−Dmin with the predetermined value C. When Dmax−Dmin>C, the image zone is discriminated as the binary image zone containing lines or a portion of character. On the other hand, when Dmax−Dmin<C, the image zone is discriminates as the gray level image zone containing photograph.

When the comparator 6-6 discriminates the image zone as the binary image zone, it produces the "1" output, and when it discriminates as the gray level image zone, it produces the "0" output.

In the above embodiment, the image zone separation correction parameter is determined by using Dmax or Dmin in the preceding image zone. When the density gradient ΔD is shape, the parameters may be determined by using the black level or the white level. Thus, more proper discrimination of the image is attained. In order to carry out the above operation, a discrimination circuit such as a comparator for discriminating the density gradient and a circuit for changing the inputs to the adders 6-5 and 6-33 from Dmax to the black level and from Dmin to the white level depending on the output of the identification circuit may be provided.

The present invention is not limited to the illustrated embodiments but various modifications may be made within the scope of the claims.

I claim:

1. An image processing apparatus comprising:
   image data input means;
   first process means for processing image data from said input means in a first process mode;

second process means for processing image data from said input means in a second process mode; and determining means for determining a characteristic of the image data from said input means and for selecting the first or second process mode in accordance with the determination result, said determining means determining a characteristic of the image data under consideration on the basis of both a parameter based on ambient input image data and the result from determination of the characteristic of the ambient image data.

2. An image processing apparatus according to claim 1, wherein said first process means halftone-processes the image data to produce a first reproduction signal, said second process means non-halftone-processes the image data to produce a second reproduction signal, and said determining means selectes a first or a second reproduction signal in accordance with the determination result.

3. An image processing apparatus according to claim 2, wherein said determining means forms the parameter on the basis of a density level of the ambient image data and determines the characteristic of the image data under consideration on the basis of the parameter, the determination result of the characteristic of the ambient image data and a density level of the image data under consideration.

4. An image processing apparatus according to claim 3, wherein said determining means comprises a first determination circuit for producing a first determination signal on the basis of the parameter, the density level of the image data under consideration and a predetermined threshold, and a second determination circuit for determining whether the image data under consideration represents a halftone image or a non halftone image and whether the ambient image data represents a halftone image or a non-halftone image so as to produce a second determination signal in accordance with the determination result of said second determination circuit, and wherein said determining means selects the first or the second reproduction signal in accordance with at least one of the first and the second determination signals.

5. An image processing apparatus according to claim 4, further comprising combining means for combining the first and second reproduction signals to produce a combination signal, wherein said determining means includes a third determination circuit for determining the density level of the image data under consideration to produce a third determination siganl and selects one of the first reproduction signals, the second reproduction signal and the combination signal in accordance with at least one of the first, second and the third determination signals.

6. An image processing apparatus according to claim 2, further comprising first delay means for delaying the first reproduction signal and second delay means for delaying the second reproduction signal.

7. An image processing apparatus comprising:

pixel data input means; and determining means for dividing the pixel data from said input means into a plurality of blocks, determining a characteristic of an image for each of the blocks and outputting for each block, a signal representative of the determination result, each block being composed of a plurality of pixel data, said determining means determining a characteristic of an image in one of the blocks on the basis of a parameter baed on pixel data of one of the ambient blocks and the result from determination of a characteristic of the image in the ambient block.

8. An image processing apparatus according to claim 7, further comprising first process means for halftone-processing the pixel data from said input means to produce a first reproduction signal and second process means for non-halftone- processing the pixel data from said input means to produce a second reproduction signal, wherein said determining means employs said representative signal to select the first or the second reproduction signal in accordance with the determination result.

9. An image processing apparatus according to claim 7, wherein said determining means forms the parameter on the basis of a density level of the ambient block and determines the characteristic of the image in the one block on the basis of the parameter and the result from determination of the characteristic of the image in the ambient block.

10. An image processing apparatus according to claim 9, wherein said determination means comprises a first determination circuit for producing a first determination signal on the basis of the parameter, the density level of the block under consideration and a predetermined threshold and a second determining circuit for determining whether the one block represents a halftone image or a non-halftone image and whether the ambient block represents a halftone image or a non-halftone image, and wherein said determining means outputs said representative signal for the one block on the basis of at least one of the first and the second determination signals.

11. An image processing apparatus according to claim 10, further comprising switching means for switching a parameter formation mode on the basis of the determination signal from said second determination circuit.

* * * * *

UNITED STATES PATENT AND TRADEMARK OFFICE
CERTIFICATE OF CORRECTION

PATENT NO. : 4,701,807
DATED : October 20, 1987
INVENTOR(S) : YOSHITAKA OGINO

It is certified that error appears in the above-identified patent and that said Letters Patent is hereby corrected as shown below:

COLUMN 1

Line 24, "e.g." should read --e.g.,--.
    Line 26, "to" should read --as to--.

COLUMN 2

Line 17, "subtractor" should read --subtracter--.
    Line 59, "denisty" should read --density--.

COLUMN 3

Line 40, "acompanying" should read --accompanying--.

COLUMN 4

Line 32, "density," should read --density--.
    Line 33, "threshold B" should read --threshold B,--.
    Line 61, "exmaple" should read --example--.

COLUMN 5

Line 14, "subtractor" should read --subtracter--.
    Line 18, "subtractor" should read --subtracter--.
    Line 24, "subtractor" should read --subtracter--.
    Line 36, "(Dmax+Dmin)/2" should read --(Dmax+Dmin)/2,--.
    Line 43, "+Dmin)/2" should read --+Dmin)/2,--.

UNITED STATES PATENT AND TRADEMARK OFFICE
CERTIFICATE OF CORRECTION

PATENT NO. : 4,701,807

DATED : October 20, 1987

INVENTOR(S) : YOSHITAKA OGINO

It is certified that error appears in the above-identified patent and that said Letters Patent is hereby corrected as shown below:

COLUMN 7

Line 59, "that to" should read --to that--.
    Line 60, "the" (first occurrence) should be deleted.

COLUMN 8

Line 15, "either" should read --dither--.

COLUMN 9

Line 30, "to" should be deleted.
    Line 32, "to" should be deleted.

COLUMN 11

Line 15, "subtractor" should read --subtracter--.
    Line 22, "subtractor" should read --subtracter--.

COLUMN 12

Line 28, "subtractor" should read --subtracter--.
    Line 33, "subtractor" should read --subtracter--.
    Line 42, "discriminates" should read --discriminated--.
    Line 52, "shape" should read --sharp--.

UNITED STATES PATENT AND TRADEMARK OFFICE
CERTIFICATE OF CORRECTION

PATENT NO. : 4,701,807
DATED : October 20, 1987
INVENTOR(S) : YOSHITAKA OGINO

It is certified that error appears in the above-identified patent and that said Letters Patent is hereby corrected as shown below:

COLUMN 13

Line 18, "selectes" should read --selects--.
Line 37, "non halftone" should read --non-halftone--.
Line 53, "siganl" should read --signal--.
Line 54, "signals," should read --signal,--.

COLUMN 14

Line 17, "baed" should read --based--.

Signed and Sealed this

Fifth Day of July, 1988

Attest:

DONALD J. QUIGG

Attesting Officer

Commissioner of Patents and Trademarks